US009388081B2

(12) United States Patent
Niveau et al.

(10) Patent No.: US 9,388,081 B2
(45) Date of Patent: Jul. 12, 2016

(54) REFRACTORY ARTICLE AND PRODUCTION PROCESS THEREOF

(75) Inventors: Nathalie Niveau, Famers (FR); Gilbert Rancoule, Marcq-en-Baroeul (FR)

(73) Assignee: VESUVIUS CRUCIBLE COMPANY, Wilmington, DE (US)

( * ) Notice: Subject to any disclaimer, the term of this patent is extended or adjusted under 35 U.S.C. 154(b) by 550 days.

(21) Appl. No.: 12/300,714

(22) PCT Filed: May 14, 2007

(86) PCT No.: PCT/EP2007/004248
§ 371 (c)(1),
(2), (4) Date: Nov. 13, 2008

(87) PCT Pub. No.: WO2007/131749
PCT Pub. Date: Nov. 22, 2007

(65) Prior Publication Data
US 2009/0160108 A1    Jun. 25, 2009

(30) Foreign Application Priority Data
May 16, 2006  (EP) ..................... 06113994

(51) Int. Cl.
C04B 35/58 (2006.01)
C04B 35/14 (2006.01)
B22D 41/02 (2006.01)
C03B 5/43 (2006.01)
C03B 35/18 (2006.01)
C04B 41/00 (2006.01)
C04B 41/45 (2006.01)
C04B 41/87 (2006.01)
F27D 1/00 (2006.01)

(52) U.S. Cl.
CPC ............... *C04B 35/14* (2013.01); *B22D 41/02* (2013.01); *C03B 5/43* (2013.01); *C03B 35/181* (2013.01); *C04B 41/009* (2013.01); *C04B 41/4537* (2013.01); *C04B 41/87* (2013.01); *F27D 1/0006* (2013.01)

(58) Field of Classification Search
CPC ........ B22D 41/02; C03B 5/43; C03B 35/181; C04B 35/14; C04B 41/009; C04B 41/4537; C04B 41/87; C04B 41/5025; C04B 41/5035; C04B 41/5024; F27D 1/0006

USPC ............ 266/275; 427/140, 226, 376.1, 376.2, 427/384; 428/446, 698, 702; 264/24, 332, 264/642, 648, 56; 501/121, 126, 134, 8, 10, 501/132; 106/38.9; 117/13, 20, 31, 33
See application file for complete search history.

(56) References Cited

U.S. PATENT DOCUMENTS

| 3,314,758 | A | * | 4/1967 | Scott et al. .................... 423/335 |
| 3,793,040 | A | * | 2/1974 | Burrows ........................ 501/103 |
| 3,950,175 | A | * | 4/1976 | Lachman et al. ............... 501/80 |
| 4,028,124 | A | | 6/1977 | Bihuniak et al. |
| 4,230,498 | A | | 10/1980 | Rueckl et al. |
| 4,429,003 | A | * | 1/1984 | Fredriksson et al. ....... 428/317.9 |
| 4,528,244 | A | * | 7/1985 | Winkelbauer et al. ........ 428/446 |
| 4,887,528 | A | * | 12/1989 | Ruge et al. .................... 101/148 |
| 5,719,322 | A | * | 2/1998 | Lansbarkis et al. .......... 73/23.39 |
| 5,885,913 | A | * | 3/1999 | Delcloy et al. .................. 501/54 |
| 6,455,102 | B1 | * | 9/2002 | Kobayashi et al. ........... 427/140 |
| 6,521,061 | B1 | * | 2/2003 | Fukunaga et al. ............ 148/549 |
| 6,562,745 | B2 | * | 5/2003 | Willkens et al. ................ 501/88 |

FOREIGN PATENT DOCUMENTS

| EP | 1348782 | | 10/2003 | |
| FR | 2707084 | | 1/1995 | |
| GB | 2154228 | A | 9/1985 | |
| JP | 411246265 | * | 3/1998 | ............ B22D 11/10 |
| JP | 2003-300742 | | 10/2003 | |
| JP | 2004-284859 | | 10/2004 | |
| RU | 2121985 | | 11/1998 | |
| RU | 2211202 | | 8/2003 | |

* cited by examiner

Primary Examiner — Scott Kastler
Assistant Examiner — Michael Aboagye
(74) Attorney, Agent, or Firm — Thomas Clinton; Donald M. Satina

(57) ABSTRACT

The present invention relates to refractory articles in general having improved surface properties. The objective of the invention is to propose an improvement of the refractory articles comprised of a fused silica matrix which will overcome the some of the defects while keeping the excellent known properties of the fused silica matrix. This objective is reached when a sintered ceramic phase is present in the porosity of at least a portion of at least a surface of the matrix. The present invention also relates to a process for producing such an article.

7 Claims, No Drawings

REFRACTORY ARTICLE AND PRODUCTION PROCESS THEREOF

CROSS-REFERENCE TO RELATED APPLICATIONS

This application is based on and claims priority under 35 U.S.C. 119 from EP06113994.5, filed May 16, 2006, and is the national phase under 35 U.S.C. §371 of PCT/EP/2007/004248, filed May 14, 2007.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

SEQUENCE LISTING

Not Applicable

BACKGROUND OF THE INVENTION

1. Field of the Invention

The present invention relates to refractory articles in general having improved surface properties. In particular, it relates to refractory articles comprised of a fused silica matrix such as rollers for conveying hot articles or articles used for the treatment of molten glass or non-ferrous metals such as crucibles for melting or crystallizing silicon, rotary degasser for the treatment of aluminum, etc.

2. Description of the Related Art

Refractory materials are widely used in highly demanding applications such as the treatment of molten metals or the handling of hot articles. In particular, materials comprised of a fused silica matrix are well known for their excellent behavior at high temperature such as their high refractoriness and low thermal expansion and for their relative inertness with respect to glass or some molten metals.

Certain surface properties of the fused silica materials however make them unsuitable for some applications. In particular, the "surface pickup" behavior (inclination of the material to pick up impurities or fragments present at the surface of the transported article) or the "surface buildup" behavior (inclination of the surface to receive and accumulate metallic particles (such as tin, silicon, etc.) possibly oxidized (tin oxide)) renders quite problematic their use as glass annealing rolls (LOR, Lehr), as glass tempering rolls (GTR) or as containers for handling and/or treating molten glass or metal (e.g. crucible for melting silicon). Marking of the transported articles and adhesion of the silicon crystal to the walls of the crucible are examples of such problems. For such applications, it is necessary either to provide the silica matrix with an expensive and elaborated coating or to use another material (such as metal).

Document GB 2 154 228 A relates to a composition for spraying against a surface to form a refractory mass in situ. Such composition is used for instance to repair the basic refractory blocks of a glass melting furnace. Document U.S. Pat. No. 4,230,498 relates to a patching compositions for refractory furnace blocks in particular silica blocks. The patching composition should bond to the hot silica blocks to which it is applied. Such compositions are used for repairing the walls of furnaces or coke ovens at high temperature. In both cases, the sprayed or patched material is added on top of the existing blocks surface so that the final surface is rough and hardly controllable.

Document FR 2 707 084 relates to an anti corrosive coating for vitreous silica refractory for molten metal applications. Sintering aids are added so that the coating sinters at temperature lower than 1200° C.; 1200° C. being detrimental for the vitreous silica substrate. According to the examples, a 1 mm coating is formed on top of the article surface.

Document U.S. Pat. No. 4,528,244 relates to a SiAlON coating applied on fused silica ware. SiAlON also presents some drawbacks. The glassy phases present in the SiAlON material imply possible gluing or sticking to the substrate. Furthermore, possible oxidation in temperature for the SiAlON and irreversible crystallization of the fused silica makes the SiAlON material unsuitable for thermal cycling applications.

In addition, the provision of a coating is always expensive since it requires additional production steps and further, is only a temporary solution since, unavoidably, the further layer of the coating material has a tendency to delaminate from the surface of the silica matrix material which not only deprives the fused silica material from the benefit of the coating but in turn produces scaling defects. For conveying applications or solid contact applications, since the coating is added on the top of the surface, it is often necessary to subject the coated article to a machining step after the coating step in order to homogenize the surface. Further, since the thermal expansion (or the thermal behavior in general) of this further layer is different from the thermal expansion (or the thermal behavior in general) of the silica matrix, constraints are generated at the interface between the coating and the silica matrix, affecting thereby negatively the surface quality. Moreover, since the thermal conductivity of this further layer is not the same as the thermal conductivity of the fused silica matrix, the transfer of heat through the article is not homogeneous. The use of metallic materials for such articles is also unsatisfactory since metals have a relatively high reactivity towards the treated or transported articles. In addition, metallic articles have a quite high flexural deformation with comparison to fused silica articles and their efficient time of use in a heavy environment (such as a Lehr or a crystallization furnace) is relatively short.

BRIEF SUMMARY OF THE INVENTION

The objective of the present invention is to propose an improvement of the refractory articles comprised of a fused silica matrix which will overcome the above discussed defects while keeping the excellent known properties of the fused silica matrix.

According to the invention, this objective (and others) is reached when a sintered ceramic phase is present in the porosity of at least a portion of at least a surface of the matrix. By surface, it is meant a substrate or active layer. The substrate or active layer of the article comprises in its porosity most of the sintered ceramic phase in contrast to the core of the article which does not comprise any sintered ceramic phase but fused silica.

The inventors have formulated the hypothesis that the above identified defects are mainly due to interactions between the glass or metal and the open porosity present at the surface of the fused silica article and have tried to find a way to fill in this surface porosity. As a result of the surface porosity being filled in, the density of the surface is therefore higher than the density of the core of the fused silica matrix. Preferably, the open porosity of the surface is at least 20% lower than the open porosity of the core of the fused silica article; most preferably 50% lower.

According to the invention, the initial surface of the silica matrix remains the surface of the finished article (only the surface porosity has been filled in over about 200 µm to 1 mm, preferably about 500 µm) so that there is no need for a further machining step after the impregnation step. The filling in of the silica matrix surface ensures material continuity between the silica matrix and the sintered ceramic phase. The further sintering of the filler together with the surface layer of the matrix ensures a very high cohesion between the matrix and the filler. Together, both contribute synergistically to significantly improve the properties and performances of the article. The filler is homogeneously dispersed on the surface layer and constitutes less than 10% by weight of the total surface layer material. This way, the system remains thermally stable, less stress are generated and tension, peeling or crazing cracks are reduced.

The surface porosity of the fused silica material is preferably filled in with a ceramic material selected from the group consisting of silicon, aluminum, zirconium and magnesium oxides, combinations thereof, boron, aluminum and silicon nitrides and combinations thereof.

The present invention also relates to a process for producing such an article. According to an advantageous embodiment of the invention, the surface of the fused silica matrix is impregnated with a solution of an organo-metallic compound providing the required metallic atom. Suitable organo-metallic compounds are silicon based (tetraethyl orthosilicates, methyl orthosilicates, silanes, etc.), zirconium based (zirconium acetate, nitrate, chlorides, oxychlorides, etc.), aluminum based (acetate, etc.), magnesium based (chlorides). Alternatively, a resin comprising the required metal atom (such as polysilane, aluminum chelate modified resin, salts of a polyacid resin, etc.) can also be used.

Alternatively, the porosity filler can be introduced as a suspension in a liquid carrier. In such a case, microparticles of the material (average grain size lower than 0.01 µm) are suspended into an appropriate liquid carrier. Suitable materials are for example metallic particles of silicon, aluminum, magnesium or their oxides or boron, aluminum or silicon nitrides, sialon.

In a further step, the surface of the article is then subjected to a thermal treatment to sinter the ceramic. A particularly suitable treatment consists in sintering by flame treating the filled in surface although in certain case, simply curing the product will provide the required treatment.

It has been measured that the surface porosity (open porosity) can be reduced by at least 50% with respect to the porosity of the core of the fused silica matrix. The pore size at the surface is also reduced from an average surface pore size of 1 µm for the untreated fused silica article down to less than 0.1 µm for the article according to the invention. The surface roughness of the article according to the invention is also dramatically reduced with respect to the fused silica matrix based articles of the prior art; according to the invention, the roughness (Ra and Rz) is significantly reduced. Ra is changed from 3 µm to less than 1.5 µm and Rz from 15 µm to less than 6 Visually, it can also be observed that the surface texture has been improved (reduction of holes, scratches, bubbles, pinholes, etc.). The flexural strength of the fused silica material (more than 20 MPa) is not affected by the surface modification.

DETAILED DESCRIPTION OF THE INVENTION

In order to better describe the invention, it will now be illustrated by means of examples that are not intended to limit the scope of the present patent application.

Example 1a

Impregnation of the Surface of a Fused Silica Article

A viscous solution of siloxane is prepared by mixing 50 wt. % of tetraethyl orthosilicate (purity 99.3%), 33 wt. % of isopropanol (purity 99.7%) and 17 wt. % (5% aqueous solution). The pH of the resulting solution is about 5.5. A fused silica roll (diameter 100 mm) is impregnated with this solution under vacuum (<0.2 bars for 1 hour). The impregnated roll is then subjected to heat (forced drying at 60° C. for 24 hours). A gel develops within the surface layer and is stabilized so that ultrafine particles of native silica are formed in situ within the surface porosity of the roll.

Example 1b

Impregnation of the Surface of a Fused Silica Article

A first impregnation solution is prepared by mixing 60 wt. % of tetraethyl orthosilicate (purity 99.3%) and 40 wt. % of isopropanol (purity 99.7%). A fused silica roll (diameter 100 mm) is immersed into this solution for 10 minutes so as to capillarily impregnate the roll surface porosity. The roll is then immersed into a solution of hydrochloric acid (5% aqueous solution). The impregnated roll is then subjected to heat (60° C. for 2 hours). This sequence of operations can be repeated if it is desired to further reduce the surface porosity. A single impregnation reduces the surface open porosity by 40%. A second impregnation further reduces the surface open porosity by another 20% and a third impregnation further reduces the surface open porosity by another 10%.

Example 1c

Impregnation of the Surface of a Fused Silica Article

Example 1a is repeated but the tetraethyl orthosilicate is replaced by a mixture of 56 wt. % tetraethyl orthosilicate and 44 wt. % zirconium acetate.

Example 1d

Impregnation of the Surface of a Fused Silica Article

Example 1a is repeated but metallic particles of silicon, aluminum, magnesium or their oxides or boron, aluminum or silicon nitrides or sialon are suspended into the solution before impregnating the fused silica roll.

Example 2

Surface Sintering of the Fused Silica Article

Articles prepared at examples 1a to 1d have been fired at 800° C. for 2 hours.

The refractory articles according to the invention find many industrial applications due to their exceptional properties. They can serve as rollers for conveying hot articles such as glass annealing rolls (Lehr or LOR) or glass tempering rolls for conveying glass sheets, rolls for heat treating stainless steel or silicon based electrical steel sheets, rolls for heat treating carbon steel sheets for hot dip galvanizing applications, containers used for the treatment of molten material (glass, metal, etc.) such as crucibles for melting, treating and/or crystallizing silicon, crucibles for melting and/or treating glass for high performance applications (for example glass for optical applications such as lenses) or articles for use in the treatment of molten materials such as rotary degassers for the treatment of aluminum, etc.

Numerous modifications and variations of the present invention are possible. It is, therefore, to be understood that within the scope of the following claims, the invention may be practiced otherwise than as specifically described.

We claim:

1. Refractory article consisting essentially of a fused silica matrix having a core and at least a surface, and a sintered ceramic phase, wherein the sintered ceramic phase is present in the porosity of at least a portion of at least a surface of the matrix, wherein the surface of the fused silica matrix remains the surface of the article, and wherein the sintered ceramic phase is introduced into a fused silica matrix comprising pores having a size from and including 1 micrometer to and including 0.1 micrometer.

2. Refractory article according to claim 1, wherein the sintered ceramic phase is present up to a depth of between 200 μm and 1 mm from a surface of the matrix.

3. Refractory article according to claim 1, wherein the sintered ceramic phase is present up to a depth of 500 μm from a surface of the matrix.

4. Refractory article according to claim 1, wherein at least a portion of the surface of the matrix has a density higher than the density of the core of the matrix and a porosity lower than the porosity of the core of the matrix.

5. Refractory article according to claim 1, wherein the sintered ceramic phase is selected from the group consisting of silicon, aluminum, zirconium and magnesium oxides, combinations thereof, boron, aluminum and silicon nitrides and combinations thereof, and aluminum and silicon oxynitrides and combinations thereof.

6. Refractory article according to claim 1, wherein the refractory article comprises a roll for conveying hot articles, wherein the roll comprises a surface for conveying hot articles, and wherein the sintered ceramic phase is present in the portion of the surface contacting the article to be conveyed.

7. Refractory article according to claim 1, wherein the refractory article comprises a crucible for handling or treating molten metal, wherein the crucible comprises an inner surface, and wherein the sintered ceramic phase is present in the inner surface of the crucible.

* * * * *